Feb. 8, 1944.          L. NEUMANN                2,341,468
                   SOUND RECORDING APPARATUS
                  Filed April 19, 1941         8 Sheets-Sheet 1
Fig. 1.
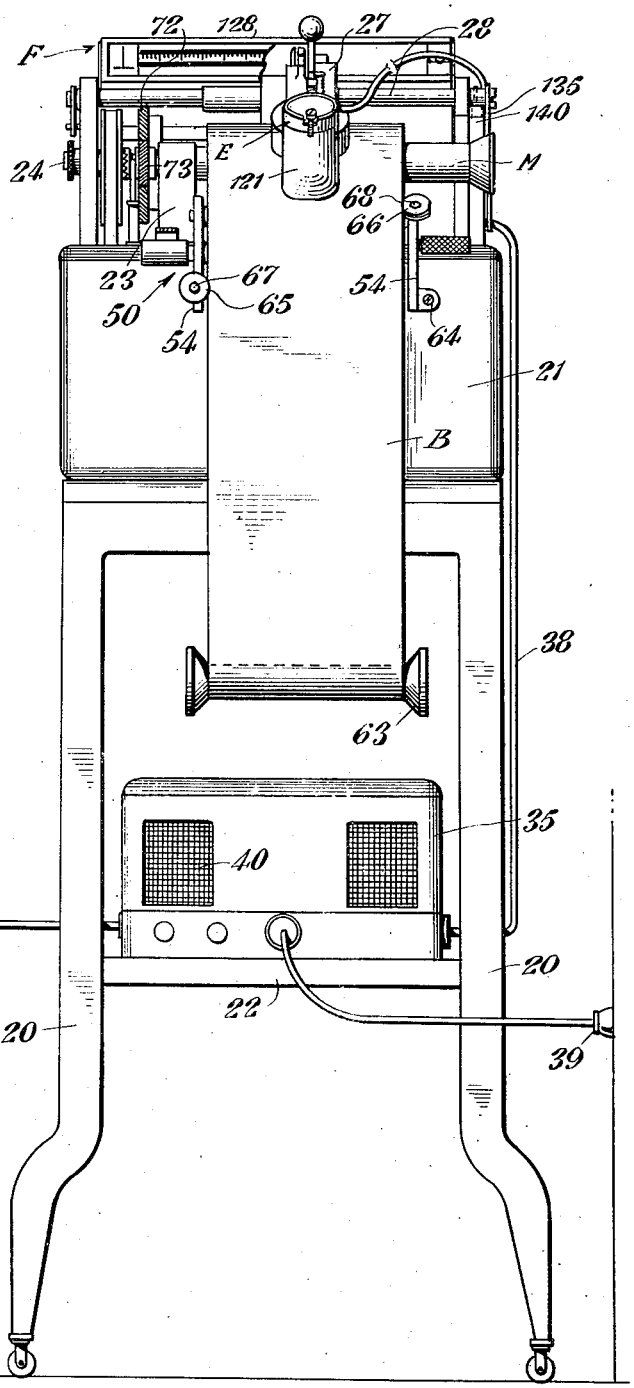
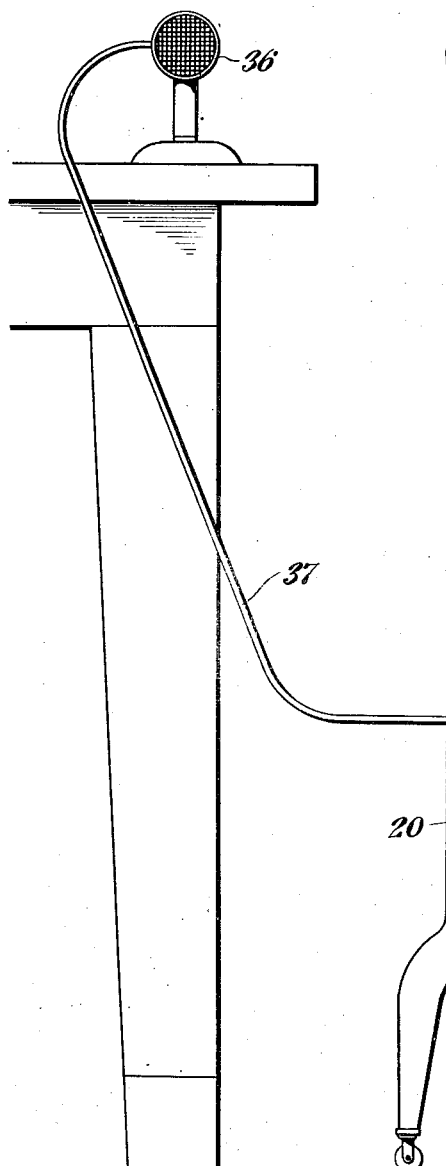
INVENTOR
Leopold Neumann
BY
Emery, Varney, Whittemore & Dix
ATTORNEYS

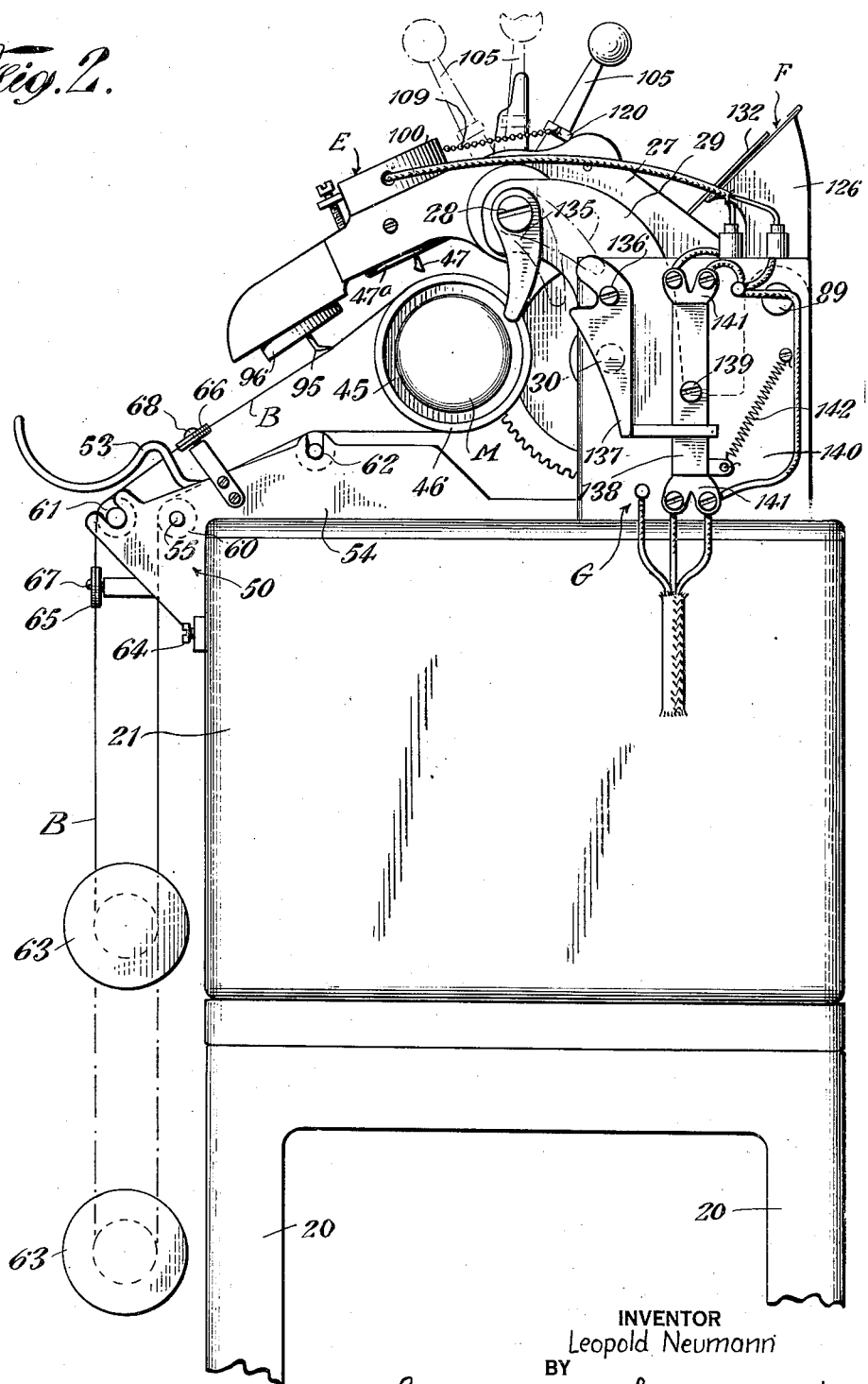

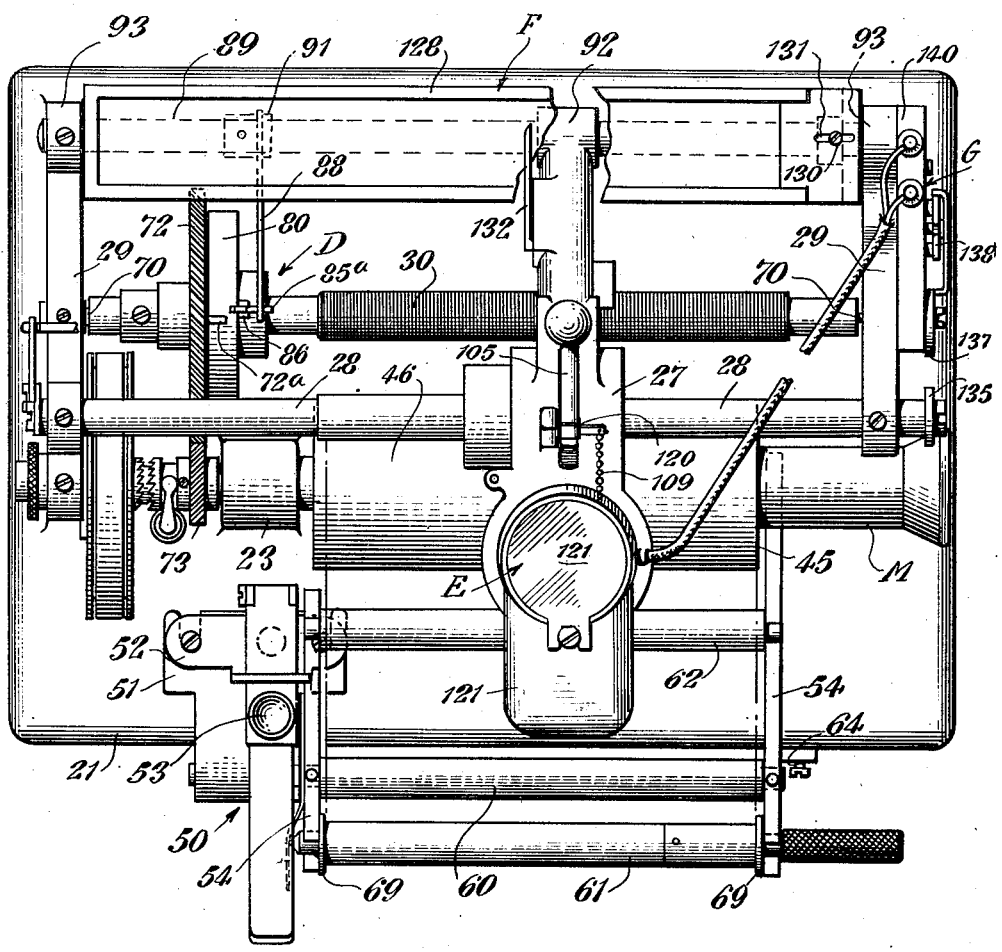

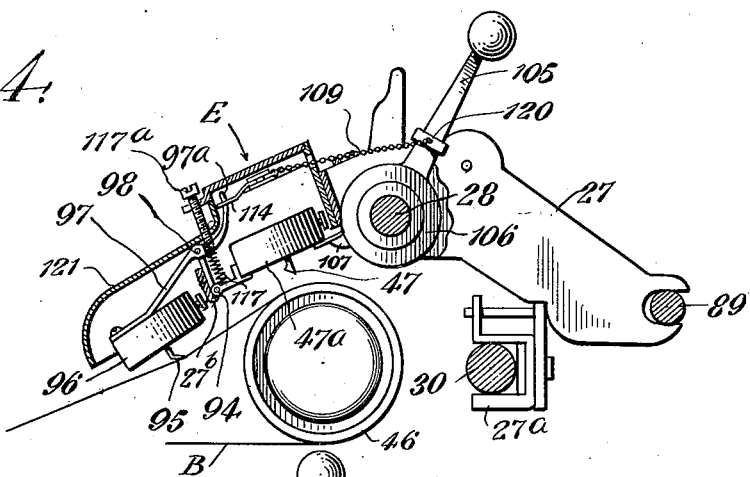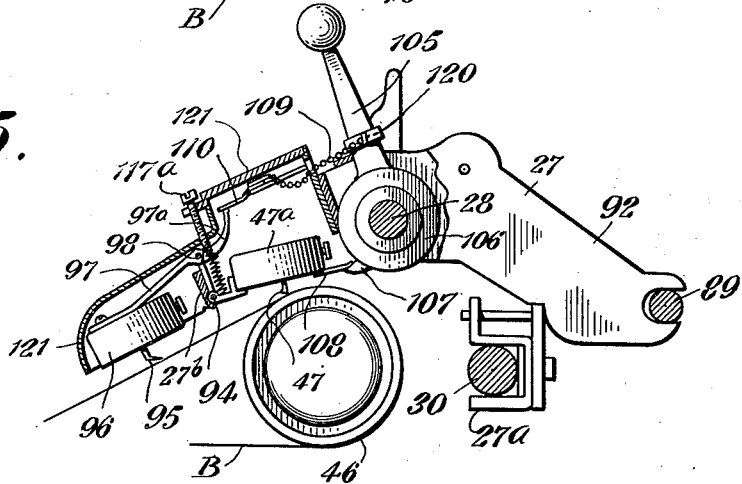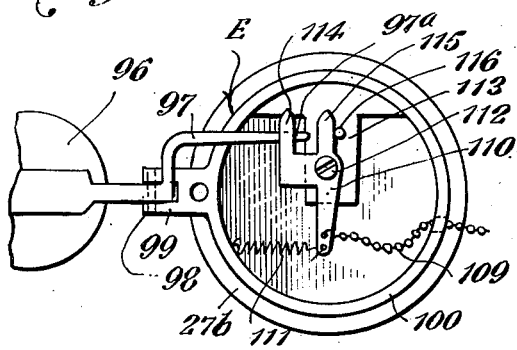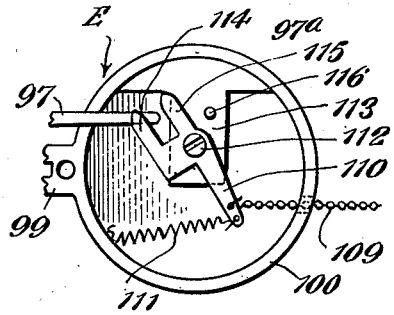

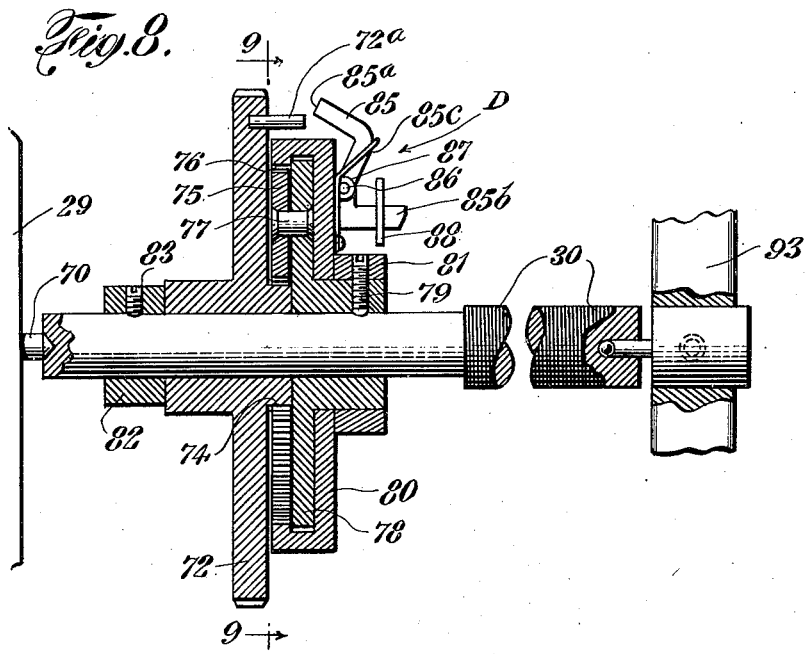
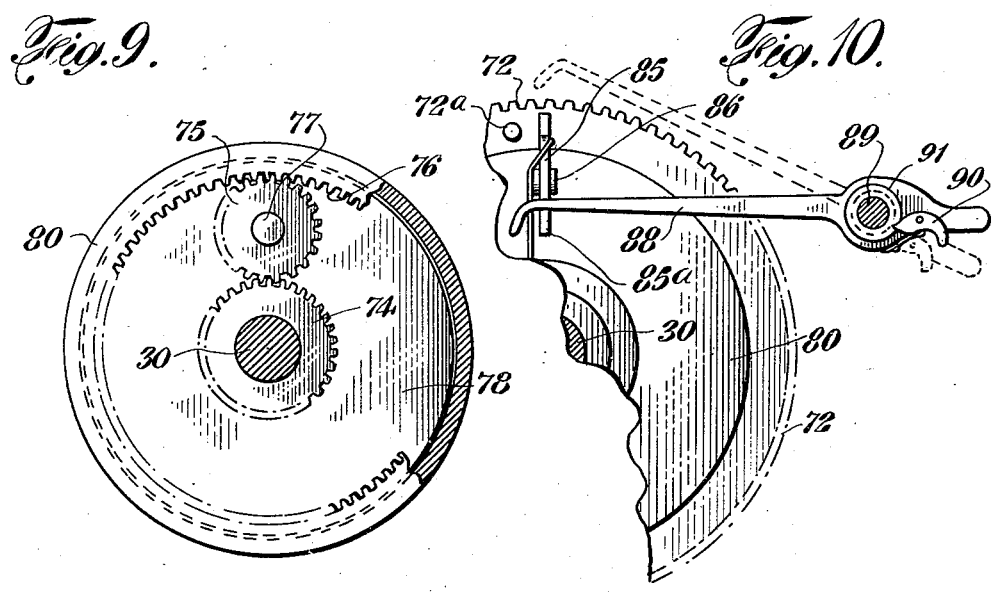

Feb. 8, 1944.  L. NEUMANN  2,341,468
SOUND RECORDING APPARATUS
Filed April 19, 1941  8 Sheets-Sheet 6
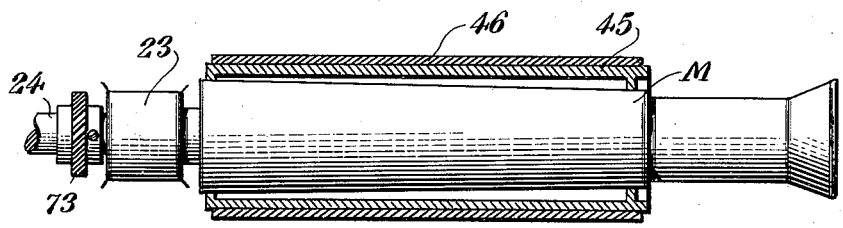
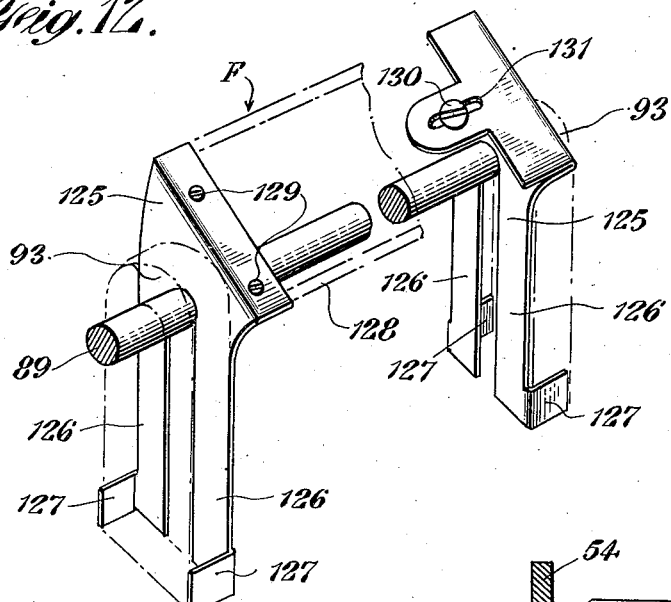
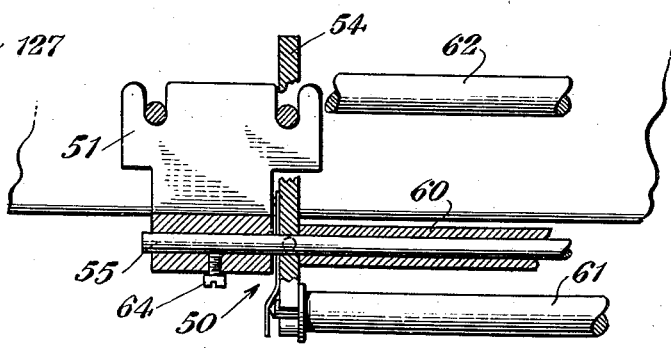
INVENTOR
Leopold Neumann
BY
Emery, Varney, Whittemore & Dix
ATTORNEYS Feb. 8, 1944. L. NEUMANN 2,341,468
SOUND RECORDING APPARATUS
Filed April 19, 1941 8 Sheets-Sheet 7

INVENTOR
Leopold Neumann
BY
Emery, Varney, Whittemore & Dix
ATTORNEYS

Feb. 8, 1944.    L. NEUMANN    2,341,468
SOUND RECORDING APPARATUS
Filed April 19, 1941    8 Sheets-Sheet 8

INVENTOR
Leopold Neumann
BY Emery, Varney, Whittemore & Dix
ATTORNEYS

Patented Feb. 8, 1944

2,341,468

UNITED STATES PATENT OFFICE 2,341,468

SOUND-RECORDING APPARATUS

Leopold Neumann, New York, N. Y., assignor, by mesne assignments, to Super-Sound Inc., New York, N. Y., a corporation of New York Application April 19, 1941, Serial No. 389,311

4 Claims. (Cl. 274—11)

This invention relates to sound recording—this term embracing also sound reproduction—and has for an object the provision of improvements in this art.

One of the objects of the invention is to provide apparatus for recording sound on an endless band or belt of thin sheet material whereby longer and selective periods of recording, and a light, inexpensive durable and easily stored record may be obtained.

Another object is to provide apparatus in the form of an attachment which may be quickly and easily installed on existing machines without in any way permanently altering or marring such machines; and which may be as quickly and easily removed to restore the machines to their original condition, if desired. Only ordinary repair tools, such as a screwdriver, pliers and wrench, or possibly a screwdriver alone, will be needed to make the transition, and no drilling, filing, cutting or other permanent alterations are entailed. As a consequence, a salesman or his assistant may convert an existing machine to the new type in a few minutes for a demonstration and as readily reestablish the original machine if the new equipment does not meet the user's requirements.

The new equipment is designed not only to fit existing machines but also to be operated by the same or similar controls and procedure as existing machines. The operator is thus enabled to use the new apparatus without the necessity of altering any of the routine habits which have been formed with the prior apparatus. And insofar as the new apparatus requires supervision in non-routine particulars, such as changing records and cleaning, it is of such a simple nature as to be readily handled even by office workers, who are not expected to be possessed of any special mechanical skill.

Since the invention provides for the use of endless sheet bands it is possible, and is also hereby provided, to use bands of different length—either to suit the convenience of normal dictation where short records are usually desired, or of conferences where long records are usually desired, or possibly intermediate or different requirements. The present apparatus provides instantaneous change of traverse speed of the sound pick-up stylus or needle, that is, the pick-up frame, for different lengths of bands.

The invention provides a friction roll or tubular cylinder for driving the band, the roll being placed on the same mandrel and in the same way as the wax cylinders commonly used, the cylinder also constituting a backing-up base for the band while the sound groove is being cut. The sheet bands are inserted over the ends of this friction roll and removed in about the same way and same time as wax cylinders. The safety mechanism, which in the original machine insures that a record will not be inserted or removed while the needle engages the record, is herein employed for operating a switch associated with the electrical amplifying apparatus to shift connections from a microphone used for dictation to a loud speaker used for play-back on the reverse. As before, only one control is required to put the cutting needle or stylus in operation, or to put the recording needle or stylus in operation, or to put both needles into non-operative position clear of the record.

Here it is to be noted that one reason for employing electrical recording equipment instead of the acoustical recording equipment commonly used for wax records is that the sheet band records are made of a material which requires more power to cut than the wax records. However, the sound tracks on the sheet records are deeper and far more permanent than the sound tracks on the wax records. Electrical recording has many other advantages over acoustical recording, one of which is the ability to amplify the reception to any extent desired so that it is not necessary to talk directly into a tube or to talk in a loud voice; on the contrary, one may place a microphone at a distance and sit at ease at a desk or around a table and talk in a normal manner and still have perfect production.

The electrical amplifying equipment may be built as a unit and be mounted by clamps or otherwise in the lower portion of the frame, as on the cross-frame usually secured between the upright supports.

The recording pick-up and stylus support or recording stylus head and the reproducing pick-up and stylus support or reproducing stylus head may be mounted on the same traversing frame as were the sound box and stylus support for acoustical recording. The drive for traversing this pick-up frame along the length of the rotating drive roll will need to be altered if bands of different length for different periods of recording are employed. To accomplish this, according to the present invention, it is only necessary to remove the regular feed screw shaft and replace it by another which has inbuilt with it a speed change mechanism, and to mount a speed change control on an available support nearby.

The invention provides means for supporting the record sheet band and placing it under tension on the friction drive roll, and also for causing it to lie flat and track accurately thereon. This mechanism is designed to keep the band clear of the edge and side of the machine frame to allow the free end of the band to extend downward toward the floor. It comprises supporting and tension rolls which may be quickly removed to permit change of record bands. The same parts serve without change for any length of band. The frame for the supporting rolls is designed to be mounted upon anchorages already provided on the machine (either a dictating or a transcribing machine, though the illustrated application is for a dictating machine). The tension roll is made as a spool which hangs in the lower end of the band loop, this arrangement having been found to provide proper tension, to hold the band flat on the friction drive roll, and to cause it to run true so that the record grooves are evenly spaced and do not run together at any point. One great difficulty encountered in prior band recording was the buckling and shifting of the band; and while many schemes were devised for overcoming the trouble, it still persisted. The present scheme is an extremely simple one but solves the problem with complete satisfaction.

The record band supporting rolls include one roll which engages the record side of the band, that is, the side on which the sound track has been cut, and collects the threadlike shavings which have been produced by the cutting stylus, thus preventing them from fouling the essential operating parts of the machine. From time to time the shavings are removed from the roll, which is readily removable for this purpose. If desired, a brush may be provided to assist in cleaning the band, but normally the collecting roll has been found to remove and retain the shavings almost perfectly.

The invention retains the marking scale strip which indicates the traversed position of the pick-up frame. If the record band extends toward the front of the machine, the marking scale is transferred toward the back, and for this purpose there is provided scale mounting means which may be readily secured to anchorages already present on the rear part of the machine. In a modification, the scale mounting is portable so as to be placed on some convenient support adjacent the machine.

The invention also provides a record sheet which is relatively free from surface noise, even when using grainy material which has a natural tendency to scratch and which heretofore has been thought unsuitable for use.

Other objects and features of the invention will appear from the following description of one embodiment of the invention, reference being made to the accompanying drawings wherein:

Fig. 1 is a front view of one well-known type of dictating machine with the present apparatus applied thereto;

Fig. 2 is an enlarged partial side view;

Fig. 3 is an enlarged top plan view;

Fig. 4 is a right end view of the pick-up frame and related parts, certain parts being shown in section along the median line of the pick-up frame;

Fig. 5 is a view like Fig. 4 but showing the reproducing instead of the recording needle in operative position;

Fig. 6 is a partial top plan view of Fig. 5 with the cover removed;

Fig. 7 is a similar view of Fig. 4;

Fig. 8 is a vertical axial section of the traversing or feed screw shaft assembly;

Fig. 9 is a transverse section on the line 9—9 of Fig. 8;

Fig. 10 is a partial section looking at the right end of Fig. 8;

Fig. 11 is a longitudinal section of the friction roll;

Fig. 12 is a perspective view of the indicator scale mounting frame;

Fig. 13 is a partial horizontal section taken near the top of the drive box to show details of the band supporting frame;

Figure 14:
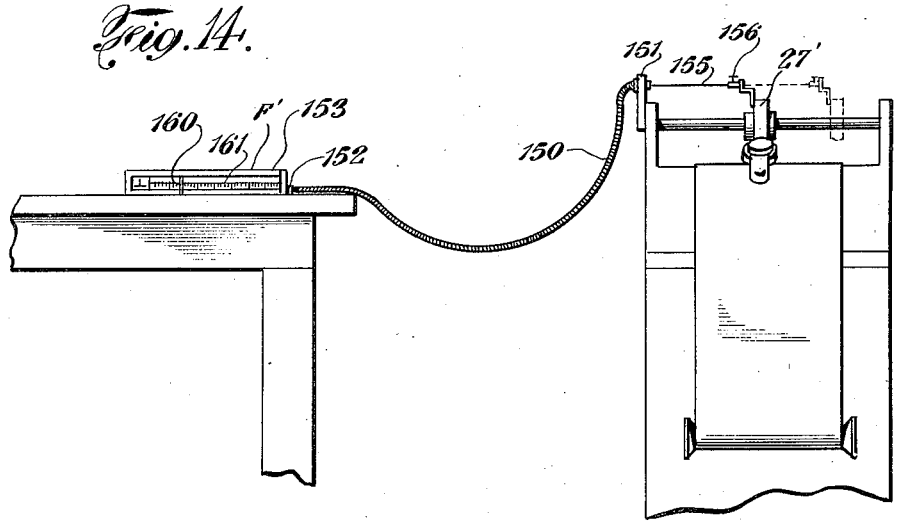
Fig. 14 is a front view similar to Fig. 1 but showing a modification in which the indicator scale mounting is connected to the machine by a flexible connection so as to be portable.

In Figs. 1 and 2 the general form of a conventional dictating machine can be recognized. It comprises a stand having supports 20, a motivating and control box 21 thereabove, a cross-frame 22 secured to the supports below the box, a standard 23 supporting a mandrel shaft 24, a pick-up or recording frame 27 slidable on a guide bar 28, and standards 29 for supporting a feed screw shaft 30. The box 21 houses suitable motive mechanism for driving the mandrel shaft 24 and the feed screw shaft 30 as well as means for controlling the movement of this mechanism, as is usual in dictating machines.

The acoustical sound recording device or head normally provided on the machine has been removed and instead there is provided an electrical recording device connected with amplifying means housed in a box 35 equipped with a suitable volume controls, a microphone 36 with leads 37 of sufficient length to permit it conveniently to be placed as far from the machine as desired, and leads 38 from the amplifying box 35 to the traversing frame 27 or to a switch serving the same. A cord-plug unit 39 for tapping an electrical power line is provided. A loud speaker, indicated by the grill 40, is also provided in the amplifying box for play-back from a reproducing stylus' which is mounted along with the recording stylus on the tranversing frame 27. The entire amplifying unit may be mounted for convenience on the cross-frame 22, though it is readily removable for mounting on a desk or elsewhere, if desired.

As indicated above, the essential characteristic of the present invention is that it provides an endless band instead of heavy wax cylinders as the medium for carrying the sound track.

One advantage is in the greater range or versatility made possible by the use of bands of different length for different purposes. For short subjects, such as normal office work, where a wax cylinder now commonly records eight minutes dictation, there may be provided a comparable short band. This may take fifteen minutes dictation instead of eight, the longer period being readily provided when using a band and having been found more convenient for this class of work. As will become apparent, it may be permissible to use less than the full area available when using a band, whereas this may not be done economically with a cylinder. When a longer record is desired, as for speeches, conferences, depositions and the like, it cannot be obtained with a cylinder, but with a band it may be obtained very readily by using a longer band and changing the traversing speed. Records extending over an hour or more without interruption may be obtained.

Another advantage is in the low expense of the records. A new wax cylinder is expensive and the cost of shaving it is considerable. The band record, even in the longer lengths is very inexpensive. For a comparable recording period the cost of a band record will be much less than the cost of a wax cylinder.

And yet another advantage is in the permanence of the record. Whereas the sound track on a wax cylinder is easily marred, even by rubbing it with the hands and is destroyed by scratching, the track made on the band is permanent. There is no economic necessity for destroying the sound track when using a band, as is done by shaving the wax cylinder, because the band is very inexpensive.

Moreover, the band may be rolled or folded into a very small space, whereas the wax record requires a large storage space. This permits marking and filing as a permanent record like sheet material, or mailing in flat packages like a letter. Even if rolled, the space and weight are very small and there is no danger of breakage in mailing, as with wax records.

The record band is herein designated by the letter B. In Fig. 2 a short band is shown in full lines and a long band is indicated in dotted lines. For simplicity, the present disclosure is limited to two lengths, with two corresponding gear changes for two traversing speeds of the pick-up frame, but upon the same principle a larger number of speed changes may be provided for a greater range of band lengths.

Having substituted a band for a circular cylinder, it is necessary to adapt the machine to the new record medium. First, the mounting and driving means will be considered. Here the same tapered mandrel M, (Fig. 11) which was used to mount the wax cylinder, is retained and employed to mount a band supporting and driving cylinder 45 provided with a friction layer or jacket 46 of suitable material. This layer must also be sufficiently hard to back up the thin sheet band against the action of the recording stylus or needle 47. Moderately hard rubber, such as that used for typewriter platens, has been found suitable for this purpose. The outer surface of the cylinder is circular and without taper, to cause the band to run true. Its outside diameter is approximately the same as that of the wax cylinders to utilize the basic driving speed of the mandrel without change. It is only necessary, therefore, to change the traversing speed of the pick-up frame as the length of band is changed, all other driving factors remaining the same as are inbuilt into the machine.

Inasmuch as the cylinder 45 may remain permanently on the mandrel, only the endless bands needing to be changed, it may be secured upon the mandrel more tightly than are wax cylinders; and, if desired, it may be clamped in a fixed position by any suitable means.

Having provided a suitable driving cylinder for the band B, it is next desirable to provide suitable supporting, guiding and tensioning means for the extended portion thereof, that is, the free portion which is not wrapped about the drive cylinder. The free end may be passed around either the rear edge or the front edge of the drive box 21. Inasmuch as there is usually more exposed mechanism in the way behind the drive mandrel than in front of it, the band is preferably passed out over the front of the box. Such an arrangement is adopted herein.

Conveniently, a roll-supporting frame 50 is provided to fit over the upper corner of the drive box 21 and a relatively thin extension 51 thereof may be secured beneath the block 52 provided on the original machine for mounting the switch control 53. The frame 50 may include end plates 54 connected in spaced relation by a rod 55.

The frame 50 supports a lower idler roll 60, as on the rod 55, for the lower span of the band to carry it clear of the corner of the drive box 21, an upper idler roll 61 for the upper span to carry it clear of the box and to hold it clear of the lower span, and a shaving pick-up roll 62 in a bend of the lower span near the mandrel. This roll 62 operates against the record-bearing side of the band and picks up the threads which are shaved in forming the sound track. Practically all such threads or shavings as are formed become wrapped around the roll on the first passage of the band. When they accumulate, the roll, being mounted at each end in slots provided in the spaced plates 54, may readily be removed and the shavings pushed off its end. Thus the band is kept substantially free of shavings in the area traversed by the recording stylus. The upper idler roll 61 is also mounted in slots at each end so as to be readily removable to permit the band to be removed.

The band is kept straight and under the tension required to cause it to travel with its drive cylinder without slippage by a tension idler roll or spool 63. The spool hangs freely in the bottom loop of the band and is immediately adaptable for bands of any length. It has been found unnecessary to provide lateral guides for the spool 63, though of course, these could easily be added. The spool may be quickly shifted from one band to another, and if one spool is not of proper weight, another which is heavier or lighter, may be readily substituted.

The record band, when thus weighted, presses its idler roll frame 50 against the corner of the box 21, hence only nominal attachment, such as is provided by the portion 51 which is clamped down, is needed. For purposes of alignment there may be provided a set screw 64 at the end away from the part 51, this set screw acting against the front face of the box 21 and being locked in adjusted position by any suitable means.

Side guides, such as the laterally and longitudinally spaced grooved rolls 65 and 66, may be provided for the upper span of the band to cause it to advance with great precision to the recording stylus. These grooved rolls may have some free axial movement on their supporting studs 67 and 68 respectively. If the side guide rolls tend to bind the band, the roll 61, for the upper span of the band which moves toward the drive cylinder, may be provided with end flanges 69.

The roll 61 may also be adjustable in length between flanges, as shown in Fig. 3. When end flanges are provided, the grooved guide rolls may be omitted, if desired. As shown in Figs. 3 and 13, a spring at the left end of the roll 61 presses that end of the roll to the right. The flange or some part on the roll shaft at the right end operates against thrust taking means on the right frame member 54. If the two parts of the roll 61 are merely adjustable, as when left unsecured to each other, the spring transmits pressure to the right hand end of the roll only through the record band; consequently the band is held firmly between the flanges of the roll and is permitted to have such variations in width as may be caused by changes in temperature, effects of forming the record grooves, or otherwise. If conditions suggest a fixed adjusted length between flanges, a set screw may be placed in the hole shown at the right side of the roll joint in Fig. 3.

There has now been provided a complete drive, guide and tensioning means for the record band, and this may be installed in a moment with only a screwdriver as a tool and without marring the basic machine in any way whatever.

Next may be considered the traversing mechanism to take care of speed changes for record bands of different lengths. This also is built as a replacement unit which may be installed with a screwdriver.

The usual feed screw 30 for traversing the pick-up frame along the record is carried between spaced pintles 70 in the standards 29, one of the pintles being adjustable to remove the shaft. In place of the normal feed screw alone there is substituted between the same pintles a feed screw shaft and speed-change drive assembly generally designated by the letter D. This assembly is separately shown in Figs. 8–10. If a short band record is desired, say eight minutes like the wax cylinder record, the feed screw and direct drive ratio of this assembly may be the same as that originally provided, merely having the speed-change unit to take care of longer bands secured thereon. If the shorter band is intended for a fifteen minute record instead of the basic eight minute record, the direct drive gearing may be appropriately changed, keeping the pitch of the feed screw the same as that of the original machine. As many different basic drive ratios and changes can be built into the removable unit as desired. In this removable unit D, the gear 72, which originally was made fast to the feed screw shaft 30, is released therefrom so as to turn loosely thereon except as forced to turn the feed shaft through the change-speed unit. The gear 72 is driven, as usual, by a pinion 73 motivated to turn at proper speed by drive means within the box 21.

The speed-change mechanism is essentially of the planetary or sun-gear type and comprises a pinion or sun gear 74 formed integrally with the hub of gear 72, a planet gear 75 meshing with pinion 74, and an internal annular gear 76 meshing with the planet gear 75. Planet gear 75 is rotatable on a bearing stud 77 carried by a plate 78 rigidly secured to the feed shaft 30 as by a set screw 79. The annular gear 76 is carried by a plate 80 which is rotatably mounted on the hub of planet gear plate 78 and retained by a collar 81. The outer edge of plate 80 is turned to overhang the outer edge of the plate 78. The large gear 72 is retained on shaft 30 by a collar 82 secured by a screw 83. A latch 85 is pivoted upon a pin 86 carried in lugs 87 secured to the annulus gear plate 80. A finger 85a of latch 85 cooperates with a stud 72a on gear 72 to lock the plate to the gear. The latch 85 is also provided with a tail 85b adapted to be pushed down and held against the action of a spring 85c by a hook 88 pivoted on a rod 89. The hook is held in raised or lowered position by a detent 90 carried thereon which engages suitable notches in a sleeve 91 secured on the rod 89. The rod 89 is an original part of the machine, being used as a guide for the tail 92 of the pick-up head. This rod 89 is held by set screws in standards 93 and may readily be removed to permit sleeve 91 to be slipped thereon and secured in proper position.

When the hook 88 holds the latch 85 and the annular gear 76 against rotation, the planet gear 75 is driven by the pinion 74 on gear 72 and planetates about the axis of shaft 30 to turn the shaft at a speed less than the speed of gear 72, say one-fourth its speed. This will give a slow traverse for long record bands. When the latch releases the hook 88 it engages the pin 72a on the large gear 72 to establish a direct drive from this gear to the shaft 30. The direct drive provides rapid traverse for the pick-up frame when short record bands are used.

It has been mentioned that even a short band may have a traverse in fifteen minutes instead of eight minutes which is usual with record cylinders. Either the gearing (72, 73) or the pitch on the feed shaft 30 provides for this. If the pitch of shaft 30 is different from that of the original worm shaft, then the pitch of the co-operating threads in the parti-nut in the tail piece 27a of the pick-up frame 27 will be correspondingly changed. As is usual in these dictating machines, the threaded tail piece 27a is disengaged from the feed shaft when the stylii of the pick-up frame are both removed from the record medium, to permit the pick-up frame to be traversed by hand for play-back and other required purposes. This mechanism need not be considered here because it is not altered in any way.

It is seen that the substitute traversing mechanism may be introduced merely by placing the assembly between the pintles which held the feed screw shaft and securing the hook sleeve 91 on the rod 89; no drilling or other operations upon the original machine being required, and a screwdriver being the only tool needed.

Next to be considered is the pick-up frame. The body of this frame is retained intact but the acoustical recording and reproducing stylii and their shiftable mounting are removed from the tubular opening of the frame, and in this opening there is placed a unitary pick-up assembly E which carries an electrical recording head 47a of the recording stylus 47. This is pivoted to the pick-up assembly E by a pin 94. Whereas formerly a single sound pick-up or diaphragm served both the recording stylus and the reproducing stylus, herein each stylus is served by a separate and distinct pick-up device, including separate pick-up heads. The reproducing stylus 95 is associated with a reproducing head 96 carried on a lever 97 pivoted on a pin 98 carried by spaced lugs 99 provided on the sides of a slot in the annular wall or ring 100 of assembly E which is secured in the opening formed by the ring or rim 27b of the recording head 27. The ring 100 is secured in the rim 27b by set screws just as was the acoustical pick-up assembly.

Means are provided for shifting the recording stylus and the reproducing stylus alternately into engagement with the record band and placing both in a neutral intermediate position where neither touches the record medium. In the neutral position the pick-up frame may be traversed by hand and the recording medium (here the band B) may be shifted on or off the mandrel. Herein the stylus shifting means comprises the usual shift handle 105 of a sleeve 106 which is turnably mounted on shaft 28. The sleeve is provided with a lug 107 which engages an extension 108 of the mounting for the recording stylus 47 and its recording head 47a to raise the stylus from the record medium.

The mechanism for shifting the reproducing stylus 95 comprises a chain 109 attached to the handle 105 at one end and to a shift cam lever 110 at its other end. A spring 111 which is attached to the lever 110 at one end and to the ring 100 at the other end urges the lever away from the handle. The cam lever 110 is pivoted at 112 to a bracket 113 secured to the head assembly rim. The lever 110 is provided with a cam arm 114 which is adapted to engage the upstanding cam arm 97a of the reproducing stylus lever 97 to raise the stylus. The lifting movement of the cam lever 110 is limited by a stop finger 115 thereof striking a fixed stop pin 116.

In the case of the reproducing stylus, the weight of its head and associated parts is sufficient to hold the stylus down on the record medium. In the case of the recording stylus, a spring 117 may assist in holding it down, the pressure of the spring being adjusted by a screw 117a. When the recording stylus is down the reproducing stylus is up, and vice versa, both being operated by the shift handle 105 moving in different directions. When the shift handle is in an intermediate position both styli stand clear of the record medium. It will be noted that the reproducing stylus engages the band off the supporting cylinder and presses it down sufficiently against the tension in the band to cause the stylus to track properly. This arrangement permits the two styli to be mounted in line for a common record groove and to give ample space on the supporting cylinder for the recording stylus.

The chain 109 is secured to the shift handle 105 by a collar 120 which is slipped down on the handle, the knob of the handle being unscrewed to permit this if necessary.

It will thus be seen that the entire assembly E may be substituted for the original acoustical pick-up assembly merely by operating two screws in the rim 27a and slipping the chain collar 120 on the shift lever 105.

A cover 121 may be placed over the frame assembly E to keep out dust and for improved appearance.

The scale supporting assembly F is mounted in an elevated position at the rear of the machine, that originally provided at the front having been detached to permit the roll carrying frame to be introduced. The substitute assembly is mounted on the rod 89 and its standards 93, there being provided two end plates 125, each having legs 126 on opposite sides of a rod-embracing slot extending up from the bottom, and each leg being provided with side flanges 127 adapted to embrace the sides of the standards 93 when the plates are pushed away from each other and toward the standards 93. The scale-supporting plate 128 forms a connection between the end plates 125 to hold them apart and in fixed position on the rod and standards after they have been slipped into position. Two permanent screws or bolts 129 may constitute the connection between one end of the scale plate 128 and one of the end plates 125 (the left), and a working screw or bolt 130 may constitute the connection at the other (right) end, the screw being set in a hole in one part (the plate 128) and in a slot 131 in the other part (here, in a flange on the plate 125).

It is only necessary to operate the single screw 130 to mount or remove the whole assembly F, as will be obvious.

A pointer 132 is provided at the rear of the pick-up frame in position to pass closely above the paper scale on the plate 128, the pointer previously provided on the front of the head being removed.

The switch unit G is mounted on the right end of the machine and is operated by a cam arm 135 which was originally provided as a safety arm on the shaft 28 for preventing insertion and removal of records except in the neutral position. A lever was pivoted on a screw 136 secured to the standards 29 to cooperate with the safety arm, and a modified form of this lever 137 is secured by the screw 136 in position to operate a switch lever 138 pivoted at 139. The pivot 139 is secured in an insulating switch mounting plate 140 which is secured in position by screw 136. The switch lever is of insulating material and at the ends carries metallic connection plates 141. By suitable contacts and leads, the details of which need not be examined here, this switch places the microphone 36, through the power amplifying equipment of the unit 35, in circuit with the pick-up head 47a when the recording stylus is down and breaks this connection and connects the loud speaker with the reproducing head 96 when the reproducing stylus 95 is down. In neutral position both connections might be dispensed with, or either connection might safely be maintained, but, as here shown, the reproducing connections are maintained in neutral position. A spring 142 is employed to keep the switch in the last mentioned position, the cam arm 135 acting to operate the switch only when the lever 105 is moved forward to recording position.

By removing the single screw 136 the original safety lever may be removed and by this one screw (or a longer one, if needed) the switch mounting plate 140 and the modified lever 137 for operating the switch are secured in place. The bottom edge of the mounting plate 140 is made to fit against the top of the drive box so as to maintain a fixed position when secured by the single screw 136.

From the above description it can be seen how by a few substitute units which are relatively simple and inexpensive, and which may be very quickly installed, the common wax cylinder machine may be changed over to a band type machine. The drive cylinder 45, the roll frame unit 50 (including the spool 63), the feed screw shaft and gear unit D (including the hook 88 and its sleeve), the sound pickup unit E, the scale mounting unit F, the switch unit G (including the lever 137), and the amplifying and control unit 35 (including the dictating stylus head 36) are the only parts required.

The drive cylinder 45 is merely slipped on the mandrel in place of the usual wax record.

The roll frame unit 50 is installed by loosening and re-tightening two screws to clamp the extension 51.

The feed shaft and gear unit D is installed by loosening two screws to remove the old feed screw shaft and gear, and tightening these screws to secure the new shaft and gear unit; and loosening two screws of rod 89 to slip the hook sleeve 91 thereon, and tightening these screws and the sleeve set screw.

The sound pick-up unit E is installed by loosening two screws in the pick-up frame ring 27b to remove the old pick-up unit, inserting the new unit and tightening the two screws, then slipping the chain collar 120 on the shift handle 105.

The scale mounting unit F is installed by removing the old scale mounting from the front (this having been done to install the roll carrying frame 50), adjusting the new mounting frame on the rod 89 and its standards, and tightening the single screw 130, then removing the old pointer from the front and securing the new pointer 132 on the back of the pick-up frame by two screws in holes already provided in the head. In some cases the screws also are already provided, there being a slight difference with different models.

The switch unit G is installed by removing a single screw to remove the former safety lever and replacing the same or a modified screw to secure the switch unit and modified lever 137.

The amplifying and control unit 35 is installed by securing it on the cross frame 22, the lead connections to the switch and pick-up heads then being made.

The record bands B are inserted and removed over the end of the driving cylinder in much the same way as wax cylinders were formerly handled, the upper guide roll 61 being removed during the exchange and being replaced in its slots beneath the upper stretch of the band to support this clear above and in front of the lower stretch. The spool 163 is then placed in the bottom loop of the band to keep it tight and straight. Bands of any length are accommodated without change in the supporting means.

The invention provides an improved record strip which is relatively free from surface noises even when sheet material which normally produces surface noises is used. A sheet material like gelatin has no noticeable grain and any sound track cut in it is quite free from surface noises. Gelatin strip, however, is weak and, in the grades commonly available, is relatively brittle particularly when aged. Other sheet materials have desirable properties in general but are grainy and the sound tracks cut in them produce very objectionable surface noises. Cellulose acetate sheet or "Cellophane" material is one of these materials. There are many types and grades.

I have discovered that the grain of these sheets runs very largely in one direction—the direction of rolling; that when the sound track is cut across the grain, the surface noise is very pronounced; but that when the sound track is cut with the grain, the surface noise is scarcely noticeable. The endless bands which are used herein are well adapted to take advantage of this characteristic of the material, and I have found that by placing the grain of the sheet material longitudinally of the band, there is practically no surface noise or scratching in the sound tracks which are cut longitudinally of the band. By this I am enabled to use a very inexpensive grade of sheet material, even that which is ordinarily used for wrapping packages, but which has very good qualities for record sheets for present purposes.

Figure 15:
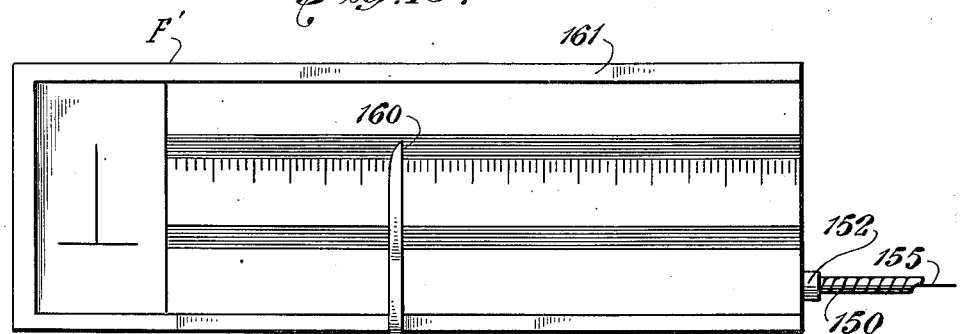
Fig. 15 is an enlarged top view of the scale mounting device.
Figure 16:
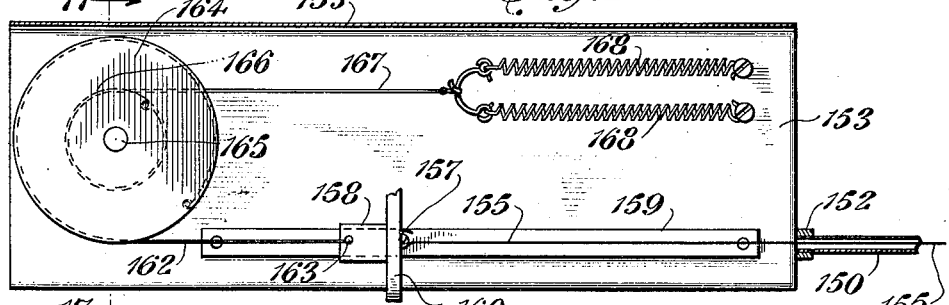
Fig. 16 is a similar view below the scale holding plate.
Figure 17:
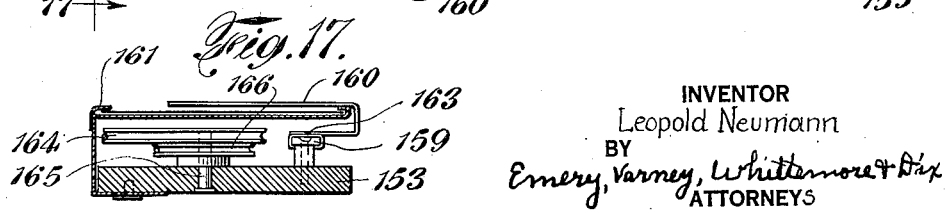
Fig. 17 is a section on the line 17—17 of Figs. 15 and 16.

In Figs. 14–17 there is shown a modified form of scale sheet support F'. This is connected to the machine by a flexible cable 150 so it is not bound to the machine but may be placed at any convenient location nearby, as on the desk or table. It may then be placed near the microphone used for the dictating machine and the control device for either a dictating or transcribing machine. The flexible cables for controlling the stop-start clutch of a dictating machine and the switch or clutch of a transcribing machine are well known and standard equipment, hence have not been illustrated herein.

The flexible cable 150 is secured at one end to a holder 151 on a standard of the machine and at the other end to a holder 152 of a backing plate 153 of the scale support F'.

Within the cable 150 there is slidably disposed a flexible wire 155. At one end the wire is secured by a holder 156 to the traversing pick-up frame 27' of the dictating or transcribing machine. At its other end the wire is secured by a holder 157 to a slide 158 movable along guides 159.

The slide 158 carries a pointing finger 160 which extends out and around so as to travel above the scale which is held in slots of its holding plate 161.

The slide 158 is pulled in one direction by the wire 155. For pulling it in the other direction to prevent slack forming in the wire, there is provided a cord 162 which is anchored at one end to the slide at 163 and at the other end to a grooved wheel 164. The wheel is carried upon a shaft 165, and it is rigid with a second grooved wheel 166 to which is attached one end of a cord 167. The other end of the cord 167 is attached to one or more light springs 168 which are anchored to the backing plate 153.

When thus mounted and connected, the finger 160 moves exactly in accordance with the movements of the pick-up frame and indicates the position of the latter on the scale exactly as if the scale were mounted along the pick-up frame on the machine.

Suitable adjustment for initial setting may be provided. For example, either end of the wire 155 may be clamped in adjusted positions.

Figure 18:
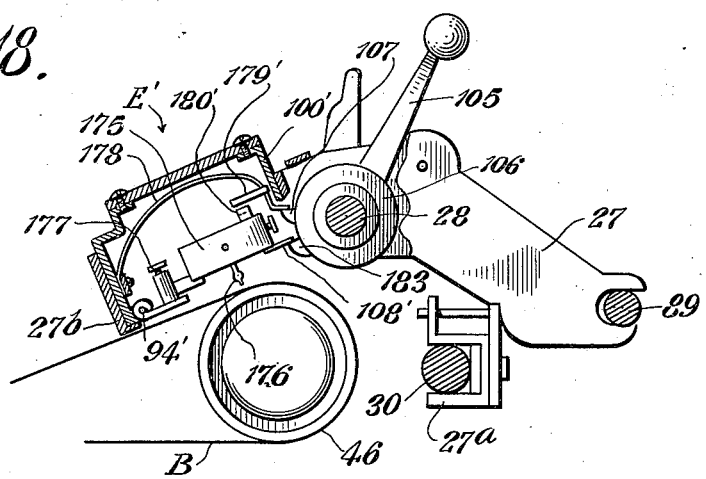
Fig. 18 is a view similar to Fig. 4 but showing a modification used for embossing instead of cutting.
Figure 19:
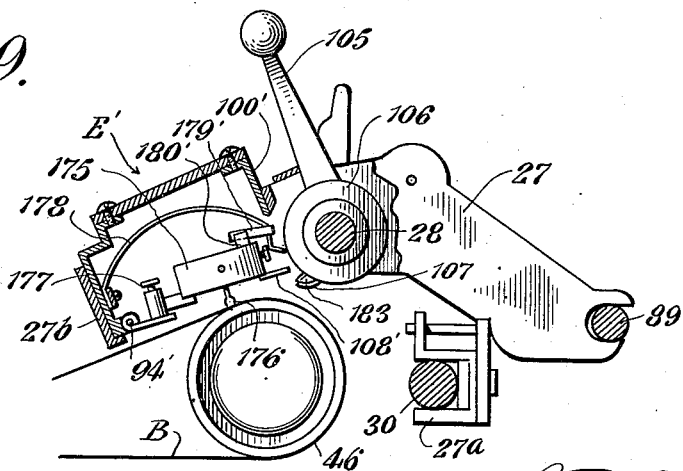
Fig. 19 is a similar view with the parts in a different position.
Figure 20:
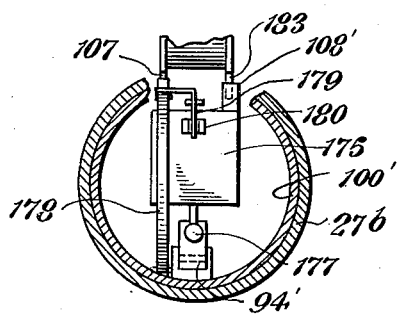
Fig. 20 is a top view, the outercasing being shown in horizontal section.
Figure 21:
Fig. 21 is an elevation of a detail.

In Figs. 18–21 there is shown a modified pick-up head assembly which is adapted for embossing instead of cutting the sound track as in Figs. 4–7.

Here the assembly E' is set into and secured in the socket 27b of the recording frame 27 in the same manner as the assembly E previously described. It comprises a ring 100' which is adapted to fit in the socket and support the pick-up head 175 of the embossing stylus 176. In this case the embossing stylus is also employed for play-back, hence there is only one stylus and one pick-up head.

The head 175 is mounted on a horizontal pivot pin 94', as before; but in the present case it is also provided with a vertical pivot pin 177 to permit it to swing horizontally as well as vertically during play-back.

A relatively heavy spring or spring-pressed member 178 is provided for holding the head down while embossing, the spring being provided with a projecting element 179 to hold the head against free side play at this time. The element, as shown, is wedge-shaped and cooperates with a V-shaped grooved member 180 on the head 175. The groove of member 180 has greater angular spread than the element 179 in order to permit ready registry and provide contact only at the bottom of the groove for the knife edge of the element. This permits some rocking movement about the knife edge in forming the sound track.

The head is provided with an extension 108' adapted to cooperate with a lug 183. This lug moves down to lower the head and permit the stylus to engage the record when the shift handle 105 is moved fully forward (Fig. 19); moves up to raise the head and lift the stylus from the record when the shift lever is moved to neutral position; and moves back down to again lower the head and stylus when the handle is moved fully backward to play-back position. In the first or recording position the lug 107 (used in the other modification) is swung downward along with the lug 183 to release the spring 178 and permit it to press the head and stylus down. At all other times the spring is held up by the lug 107.

It may be explained that the lugs 107 and 183 are parts of the original machine and operate in the same way as on the original machine. These parts are well known to those familiar with this type of machine. The lug 107 is constantly urged upward by a spring which is stronger than the spring 178 but in the neutral position engages a fixed stop and can move up no further though the shift handle moves on back to the play-back position. The lug is positively moved down against its spring by a cross pin carried by the hub of the shift handle when the handle is moved forward to dictating or recording position.

The lug 183 is constantly urged down by a light spring and constantly urged upward by a heavy spring. When the shift handle is moved forward to dictating or recording position the cross pin pushes the lug down against its heavy spring. When the handle is moved to neutral position the heavy spring moves the lug up against its light spring. And when the handle is moved to play-back position a cam pin on its hub moves the heavy spring down to permit the light spring to move the lug down. This lug operating mechanism per se forms no part of the present invention, merely being utilized to move parts which are provided by this invention.

The operation of the embossing and play-back mechanism is thought to be clear from the description thereof without further explanation.

The details of installation are given for one model of one widely used type of dictating machine, but it will be clear from this example that skilled mechanics will readily be able to adapt the invention to other models and types. It will also be clear that the units, so far as needed, may readily be used on a transcribing machine.

It is to be understood, therefore, that the invention may have various embodiments, both as an attachment for existing machines and as an original machine, within the limits of the prior art and the scope of the subjoined claims.

What I claim is:

1. Sound recording apparatus comprising in combination, a rotating friction drive and backing cylinder, a sheet record band on said cylinder, a roll supporting one part of said band in a lateral span to a downwardly extending loop, a second roll supporting the other part of the band in a lateral span clear of the first span to the downwardly extending loop, a cleaning roll bearing against the outgoing record surface beneath the lower span of the band to pick up shavings therefrom, and a flanged spool suspended in said loop to hold the band in tension against said cylinder and said rolls.

2. Sound recording apparatus comprising in combination, a friction drive and backing cylinder rotatably mounted above a main frame, a supporting roll frame removably mounted on the edge of said main frame, supporting rolls for the two parts of the band removably supported in said roll frame, a sheet record band passing around said drive cylinder and having its two parts supported on said rolls to form lateral spans and a downwardly extending loop hanging free and clear of the main frame, and a flanged spool suspended freely in said loop to hold the band in tension against said cylinder and said rolls.

3. Sound recording apparatus comprising in combination, a drive box, a friction drive and backing cylinder supported upon a rotatable arbor and removable from one end thereof, a supporting roll frame removably mounted on an edge of the drive box, supporting rolls mounted on said frame at one side of and parallel to said drive cylinder and at the corner of the box, a sheet record band insertable over the end of said cylinder and supported in spaced lateral spans by said supporting rolls, the band extending transversely from said drive roll to said supporting rolls and to a vertical portion hanging in a free loop beyond said supporting rolls, the supporting roll for the upper stretch of the band being mounted in notches for quick removal, and a flanged spool suspended freely in said loop to hold the band in tension against said cylinder and said rolls.

4. Sound recording apparatus comprising in combination, a drive box, a cylinder arbor or mandrel thereon, a friction band drive and backing cylinder supported on the mandrel and removable from one end thereof, a supporting roll frame of angular shape removably secured on the front upper edge of the drive box, a thin extension on one end of the frame clamped beneath a part already provided on the drive box, a screw at the other end of the frame bearing against the front of the drive box for aligning the same, band supporting and guide rolls on said frame, a record band passing around said drive cylinder and over said supporting rolls to a vertical loop in front of the box, and a flanged spool in the lower end of the loop to put tension in the band.

LEOPOLD NEUMANN.